Sept. 26, 1972　　　K. R. GUENTHER　　　3,694,164
CARBON DIOXIDE SENSORS
Filed Dec. 11, 1970

3,694,164
CARBON DIOXIDE SENSORS
Karl R. Guenther, Middleton, Wis., assignor to
Bjorksten Research Laboratories, Inc.
Filed Dec. 11, 1970, Ser. No. 97,072
Int. Cl. G01n 21/26, 25/48, 27/12
U.S. Cl. 23—254 R                        5 Claims

ABSTRACT OF THE DISCLOSURE

A system for sensing carbon dioxide content of a gas, in which the surface changes in properties reversibly when in contact with said gas. This is employed together with a means for effecting said contact and a means used for measuring the change in composition. This change in the surface can be chemical, as for example a complex comprising an amine which reversibly absorbs carbon dioxide; or a condition of temperature, in which case the heating effect of an infra red radiation source placed at some distance from the sensing surface, causes a warming of this surface, and a differential thermometer arrangement measures the temperature of this surface in comparison with a standard in which the same infra red source irradiates another surface similarly, except that the light does not go through any gas cell of changeable composition.

PRIOR ART

A number of instruments have been devised for sensing the concentration of carbon dioxide in gas streams. Some of these have depended on selective absorption and work intermittently. The most successful have depended on the absorption of infra red rays by the carbon dioxide molecule. These latter instruments are high in cost, and are therefore not readily adaptable to use in a home or industrial site as are thermostats and humidity sensors.

An object of this invention is to produce a low cost simple means for detecting concentration of carbon dioxide in the atmosphere, within the range practically occurring in home or industrial atmospheres. Another object of the invention is means for determining continuously and controllably the carbon dioxide content in a natural gas, with an accuracy of at least ±.1%, and in the range of 0 to 3%.

Further objects will become apparent as the following detailed description proceeds.

BRIEF DISCUSSION OF THE INVENTION

A basic idea of this invention is to a measure properties of a surface in contact with the carbon dioxide of the air, and in reversible equilibrium therewith.

This measurement can be made as a temperature measurement, in which a differential thermometer arrangement is employed, and dependent on the absorption of infra red radiation by carbon dioxide which in turn depends on the content of the carbon dioxide in the gas thru which the radiation passes. This is compared with another similar surface, thru which the same radiation can reach, without passing thru the carbon dioxide containing atmosphere.

Another embodiment of the invention deals with impregnated porous or otherwise absorbent surfaces including sand blasted surfaces, where the carbon dioxide causes measurable changes in the properties of said surface. The properties measured could be optical, or also electrical conductivity for changes. A suitable absorbent surface is for example the surface containing an amine having the general formula

in which R is selected from the group consisting of alkyls and aryls and $R_1$ is selected from the group consisting of alkyl, aryls, hydrogen and another molecule which also has the generic formula

DRAWINGS

Figure 1:
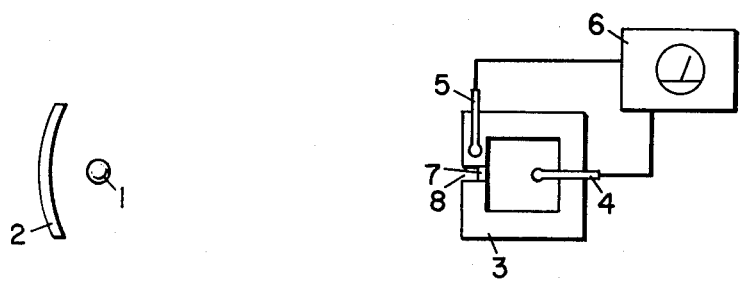
Figure 2:
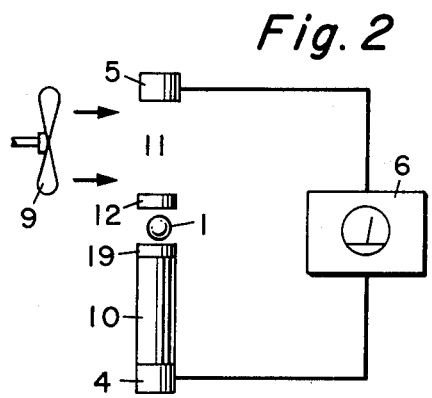
Figure 3:
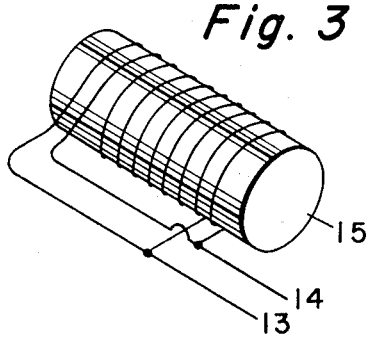
Figure 4:
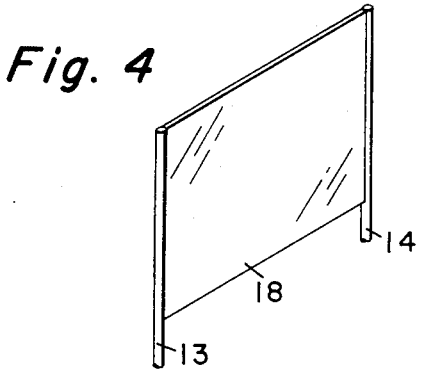
Figure 5:
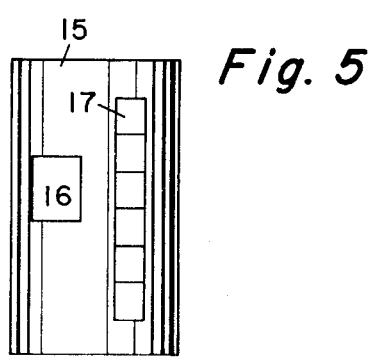

The invention is described with reference to the drawings, of which FIGS. 1 and 2 are schematic diagrams of the invention, and FIGS. 3, 4, and 5 illustrate various embodiments of the sensing device. FIGS. 3 and 4 are perspective views and FIG. 5 is a side view.

DETAILED DECRIPTION OF THE INVENTION

Referring to FIG. 1, the infra-red 1 source is mounted at a fixed distance from the cell 3. The radiation is focused on the face of the cell by means of a concave mirror 2 such that the beam of radiation covers the major portion of the face of the cell. The cell 3 is constructed of a highly conductive material such as aluminum and is filled with pure $CO_2$ gas. The face of the cell contains a small aperture 8 whose area is 5% of the area covered by the beam of radiation. The aperture is sealed by a window 7 which transmits virtually 100% of the infra red radiation which is absorbed by $CO_2$. The inner chamber of the cell is fitted with a thermistor 4 whose sensing element is totally in the gas phase. The face of the cell is fitted with a thermistor 5 whose sensing element is embedded in the metal wall. The two thermistors are connected to a sensing device 6 which senses the difference between the two temperatures. The source and sensor are turned on and allowed to come to temperature equilibrium in an atmosphere virtually free of $CO_2$ and the sensor set at 0. Upon exposure to an atmosphere of $CO_2$ the radiation formerly absorbed by the gas in the cell is decreased markedly whereas that absorbed by the face of the cell is affected only slightly. The temperature differential therefore becomes greater and is measured by the sensor. Since we are measuring a temperature differential between the face of the cell and the $CO_2$ gas, changes in ambient temperature are compensated for as well as fluctuations in the radiation sensor.

FIG. 2 shows another modification of the invention. Here the radiation from the infra-red lamp 1 is divided so that a part of it is directed to a thermistor 4, and passes thru a cell containing a dry gas which is nonabsorbent in the infra-red such as for example dry nitrogen. The space from the radiant source 1, to the other thermistor 5 is open if the air of the room is to be measured, or may be also a cell similar to that in the first case, cell 10 containing dry nitrogen. In an alternate case, I have instead of the open air space a cell thru which the gas to be measured is circulated. In the embodiment shown by FIG. 2 the ambient air is being measured, so that an open gap exists between the radiant source 1 and the thermistor 5. This is designated as 11. The air moving means 9 is here a fan, which insures continual circulation of the air for the purpose of good sampling. 12 (not necessary) is a face plate similar to the face plate 19 in cell 10, and has for its purpose to equalize the two cell paths as to radiation absorption with respect to all factors except the carbon dioxide content in the circulating gas. The function is similar to that described above in connection with FIG. 1. The instrument in similar manner measures by means of sensor 6 the difference in a heat generated by radiation on thermistors 4 and 5 which within the set-up described can be calibrated in terms of carbon dioxide content with an accuracy easily of ±.1% within the range of 0 to 3% and even 0 to 6%.

FIG. 3 shows a still further embodiment of the invention. In this 15 is a cylinder which has been sandblasted on its surface, so as to provide capillary holding power for a small amount of super-imposed liquid, semi-liquid or solid material. Around this cylinder which is impregnated thus provided with a surface layer comprising an organic amine having the generic chemical formula $RNHR_1$ in which R is an alkyl or aryl, and $R_1$ is selected from the group consisting of alkyls, aryls, hydrogen and amines said product being water soluble and having a molecular weight between 100 and 2,000 and being substantially nonvolatile. The amine composition may also be compounded with a hydroscopic agent, if the relative humidity of the gas measured is subjected to considerable fluctuations. The resultant system will sense the carbon dioxide content of the air, other parameters being substantially equal. The sensing is here carried out by means of the measurement of the conductivity of the substance between the spirally wound parallel conductors 13 and 14.

FIG. 4 shows a similar arrangement, in which 18 is a porous film holding an amine type compound as described above (FIG. 3), by capillarity. In this case the sensing element is a flat surface, easily suspended, which lends itself to measurements of optical properties in reflected or transmitted light. The sensing may then be carried out either by the measurement of electrical resistance in the same manner as just described in connection with FIG. 3, or it may be carried out optically by determining the intensity of transmitted or reflected light.

In FIG. 5, 16 is a similar porous impregnated surface, the compound however also contains a color changing indicator, which in this set-up will change color in accordance with the carbon dioxide content. 17 is a printed color scale for the sake of comparison. This instrument is not particularly sensitive, and the range it covers is small, however, it has the merit of low cost and within this range it may serve useful purposes for keeping monitoring carbon dioxide content within certain close limits.

The system, variations and uses thereof, disclosed in connection with this invention, lend themselves to determining the carbon dioxide content of neutral gases. They are generally not suitable for determining carbon dioxide content of strongly acidic gases such as hydrochloric acid or chlorine, or sulfur dioxide, nor of strongly alkaline gases such as ammonia.

Among the compositions employed, for $CO_2$ equilibration, I prefer to use the primary alkyl amines which have a molecular weight between 100 and 2,000, and which are substantially non-volatile at any temperature encountered in the range of use for which they are intended. In the majority of instances this means that they should not change in weight or in conductivity more than 1% within the period of 1 year at an average operational temperature of 100° F. Another preferred group is secondary alkyl or alkyl aryl amines having molecular weights and volatility as just described.

In addition to having the amine compound held by capillarity in a porous body, I may also have it dispersed or dissolved in a permeable hygroscopic polymeric film. For example, amylbenzyl amine is soluble up to .2% in a polyvinyl chloride film plasticized with 30% dioctyl stearate. Such a film shows electrical fluctuations with carbon dioxide content. Another system is that of the cellulose methylethyl ether, which has been saturated with amyloctyl amine.

Other systems include polyvinyl alcohol with aniline, carboxymethyl cellulose with piperidine, cellulose acetate butyrate with guanidine, polyvinyl acetate with pyridine.

Generally, I may use for this purpose any plasticizable polymeric film, which can be made to contain one of the components described in claim 1, in a manner and/or by means capable of contacting the ambient gas. I prefer to use such films in thickness between .1 mil and 3 mils; somewhat heavier films, say up to 10 mils can be used where this is desirable from the standpoint of high mechanical ruggedness, and where high sensitivity and rapid reaction are not of the greatest essence.

As an indicator substance I prefer to use an indicator which reacts in the range of pH in view of one of these reversible carbon dioxide systems, for example, I may use as an indicator Brom cresol purple or Brom thymol blue.

Having thus disclosed my invention, I claim:

1. As a chemical sensor for carbon dioxide, a wafer comprising a core member essentially comprising a nonvolatile organic amine having the generic chemical formula

in which R is selected from the group consisting of alkyls and aryls having at least 5 carbon atoms, $R_1$ being selected from the group consisting of alkyls, aryls, hydrogen and amines, said product being substantially nonvolatile, water soluble, and having a molecular weight between 100 and 2,000 and a color indicator responsive to changes in $CO_2$ content; and an envelope for said core member consisting at least on one side thereof of a film .1 to 10 mils thick and made of a polymeric substance essentially permeable to carbon dioxide.

2. The system of claim 1 in which the said amine is a primary alkyl amine having a molecular weight between 100 and 2,000.

3. The system of claim 1 in which the said amine is a secondary alkyl amine having a molecular weight between 100 and 2,000.

4. The system of claim 1, in which said amine is dispersed in a permeable, hygroscopic polymeric film.

5. The system of claim 1 in which said amine is held by capillarity to a sandblasted hard surface.

References Cited

UNITED STATES PATENTS

| | | | |
|---|---|---|---|
| 3,068,073 | 12/1962 | Stanford | 23—232 R |
| 3,146,070 | 8/1964 | Collins | 23—253 TP |

OTHER REFERENCES

R. Seiyama et al., Anal. Chem. 38, No. 8, July 1966, pp. 1069–1073.

MORRIS O. WOLK, Primary Examiner

R. M. REESE, Assistant Examiner

U.S. Cl. X.R.

23—232 R, 254 E, 255 E